US012640320B2

(12) United States Patent
Fujiwara et al.

(10) Patent No.: US 12,640,320 B2
(45) Date of Patent: May 26, 2026

(54) ELECTRIC CIRCUIT BREAKER DEVICE

(71) Applicant: DAICEL CORPORATION, Osaka (JP)

(72) Inventors: Tomohide Fujiwara, Tokyo (JP); Katsuya Tone, Tokyo (JP)

(73) Assignee: DAICEL COPORATION, Osaka (JP)

( * ) Notice: Subject to any disclaimer, the term of this patent is extended or adjusted under 35 U.S.C. 154(b) by 266 days.

(21) Appl. No.: 18/285,108

(22) PCT Filed: Feb. 1, 2022

(86) PCT No.: PCT/JP2022/003733
§ 371 (c)(1),
(2) Date: Sep. 29, 2023

(87) PCT Pub. No.: WO2022/209250
PCT Pub. Date: Oct. 6, 2022

(65) Prior Publication Data
US 2024/0186083 A1 Jun. 6, 2024

(30) Foreign Application Priority Data
Mar. 31, 2021 (JP) ................................. 2021-059908

(51) Int. Cl.
*H01H 33/04* (2006.01)
*H01H 33/53* (2006.01)

(52) U.S. Cl.
CPC ............ *H01H 33/04* (2013.01); *H01H 33/53* (2013.01)

(58) Field of Classification Search
CPC .......... H01H 33/04; H01H 33/53; H01H 9/30; H01H 39/006; H01H 39/004; H01H 39/002; H01H 39/00; H01H 2039/008
(Continued)

(56) References Cited

U.S. PATENT DOCUMENTS 10,685,799 B2 6/2020 Sakai et al.
10,832,882 B2 * 11/2020 Yamada ................ H01H 39/00
(Continued)

FOREIGN PATENT DOCUMENTS

JP 2007-534107 A 11/2007
JP 2012-138281 A 7/2012
(Continued)

OTHER PUBLICATIONS

Translation of JP2020123570 (Original document published Aug. 13, 2020) (Year: 2020).*
(Continued)

*Primary Examiner* — William A Bolton
(74) *Attorney, Agent, or Firm* — BIRCH, STEWART, KOLASCH & BIRCH, LLP

(57) ABSTRACT

An electric circuit breaker device includes: a housing including an accommodating space inside; a projectile projected from a projectile accommodating portion toward an arc-extinguishing region portion side by energy received from the igniter; and a conductor piece provided at the housing and forming a portion of an electric circuit, the conductor piece including, at a portion of the conductor piece, a cutoff portion to be cut off by the projectile. The projectile includes, on a distal end side, a cutting-off surface configured to cut off the cutoff portion during actuation of the igniter. Of the conductor piece, at least one of a first surface facing a projectile accommodating portion side or a second surface facing the arc-extinguishing region portion side is formed with a cutting-off assisting groove at a predetermined expected cutting-off position where the cutoff portion is pressingly cut by the cutting-off surface during actuation of the igniter.

2 Claims, 7 Drawing Sheets

(58) Field of Classification Search
USPC ................. 218/155, 51, 95; 200/61.08, 244; 337/157, 401, 237; 83/639.4
See application file for complete search history.

(56) References Cited

U.S. PATENT DOCUMENTS

| | | | |
|---|---|---|---|
| 2006/0145808 | A1 | 7/2006 | Von Behr et al. |
| 2013/0056344 | A1 | 3/2013 | Borg |
| 2013/0263715 | A1 | 10/2013 | Ukon et al. |
| 2019/0244778 | A1 * | 8/2019 | Dariavach ............ H01H 39/006 |
| 2020/0203102 | A1 * | 6/2020 | Sakai ................... H01H 39/006 |
| 2020/0350131 | A1 * | 11/2020 | Volkmann .............. B23D 15/14 |
| 2021/0233729 | A1 | 7/2021 | Nakatani et al. |

FOREIGN PATENT DOCUMENTS

| | | | | |
|---|---|---|---|---|
| JP | 2013-522834 | A | 6/2013 | |
| JP | 2019-212612 | A | 12/2019 | |
| JP | 2020123570 | A * | 8/2020 | ............ H01H 39/00 |
| JP | 2020-161468 | A | 10/2020 | |
| WO | WO 2020/158693 | A1 | 8/2020 | |
| WO | WO 2020/204154 | A1 | 10/2020 | |

OTHER PUBLICATIONS

International Search Report dated Mar. 29, 2022 for Application No. PCT/JP2022/003733 with an English translation.
Written Opinion of the International Searching Authority dated Mar. 29, 2022 for Application No. PCT/JP2022/003733 with an English translation.
Extended European Search Report for European Application No. 22779479.9, dated Feb. 7, 2025.

* cited by examiner

ELECTRIC CIRCUIT BREAKER DEVICE

TECHNICAL FIELD

The present invention relates to an electric circuit breaker device.

BACKGROUND ART

An electric circuit may be provided with a breaker device configured to be actuated when an abnormality occurs in a device constituting the electric circuit or when an abnormality occurs in a system in which the electric circuit is mounted, thereby urgently interrupting the continuity of the electric circuit. Electric circuit breaker devices have been proposed in which, according to one aspect thereof, a projectile is moved at high speed by energy applied from an igniter or the like to forcibly and physically cut a conductor piece that forms a portion of an electric circuit (refer to Patent Document 1 and the like, for example). Further, in recent years, electric circuit breaker devices applied to electric vehicles equipped with a high-voltage power source are becoming increasingly important.

CITATION LIST

Patent Documents

Patent Document 1: JP 2013-522834 T
Patent Document 2: JP 2007-534107 T

SUMMARY OF INVENTION

Technical Problem

When cutting a conductor piece forming a portion of an electric circuit by actuation of an electric circuit breaker device, an arc is likely to be generated during cutting. Failing to sufficiently suppress the arc may cause damage to a device to which the electric circuit breaker device is connected. Therefore, a technology for effectively suppressing an arc is desired.

The technology of the present disclosure has been made in view of the circumstances described above, and an object thereof is to provide an electric circuit breaker device that suppresses generation of an arc during actuation.

Solution to Problem

In order to solve the above problem, an electric circuit breaker device according to the present disclosure includes: a housing including an accommodating space inside, the accommodating space extending in one direction and including a projectile accommodating portion formed at one end side and an arc-extinguishing region portion formed at the other end side: an igniter provided at the housing: a projectile accommodated in the projectile accommodating portion and configured to be projected from the projectile accommodating portion toward an arc-extinguishing region portion side along the accommodating space by energy received from the igniter: and a conductor piece provided at the housing and forming a portion of an electric circuit, the conductor piece including, at a portion of the conductor piece, a cutoff portion to be cut off by the projectile, the cutoff portion being disposed crossing between the projectile accommodating portion and the arc-extinguishing region portion, wherein the projectile includes, on a distal end side, a cutting-off surface configured to cut off the cutoff portion during actuation of the igniter, and of the conductor piece, at least one of a first surface facing a projectile accommodating portion side or a second surface facing the arc-extinguishing region portion side is formed with a cutting-off assisting groove at a predetermined expected cutting-off position where the cutoff portion is pressingly cut by the cutting-off surface during actuation of the igniter, the cutting-off assisting groove having a shape conforming to a contour of the cutting-off surface.

The cutting-off surface may have a circular shape, and the cutting-off assisting groove may have a circular arc shape as seen in a moving direction of the projectile.

The cutting-off assisting groove may be formed as a V-shaped groove of which a cross-sectional shape along a thickness direction of the conductor piece is V-shaped.

The cutting-off assisting groove may be formed on both a first surface side and a second surface side of the conductor piece.

Advantageous Effects of Invention

According to the present disclosure, it is possible to provide an electric circuit breaker device that suppresses generation of an arc during actuation.

DESCRIPTION OF EMBODIMENTS

First Embodiment

An electric circuit breaker device according to an embodiment of the present disclosure will be described below with reference to the drawings. Note that each of the configurations, combinations thereof, and the like in the embodiment are an example, and various additions, omissions, substitutions, and other changes may be made as appropriate without departing from the spirit of the present disclosure. The present disclosure is not limited by the embodiment and is limited only by the claims.

Configuration

Figure 1:
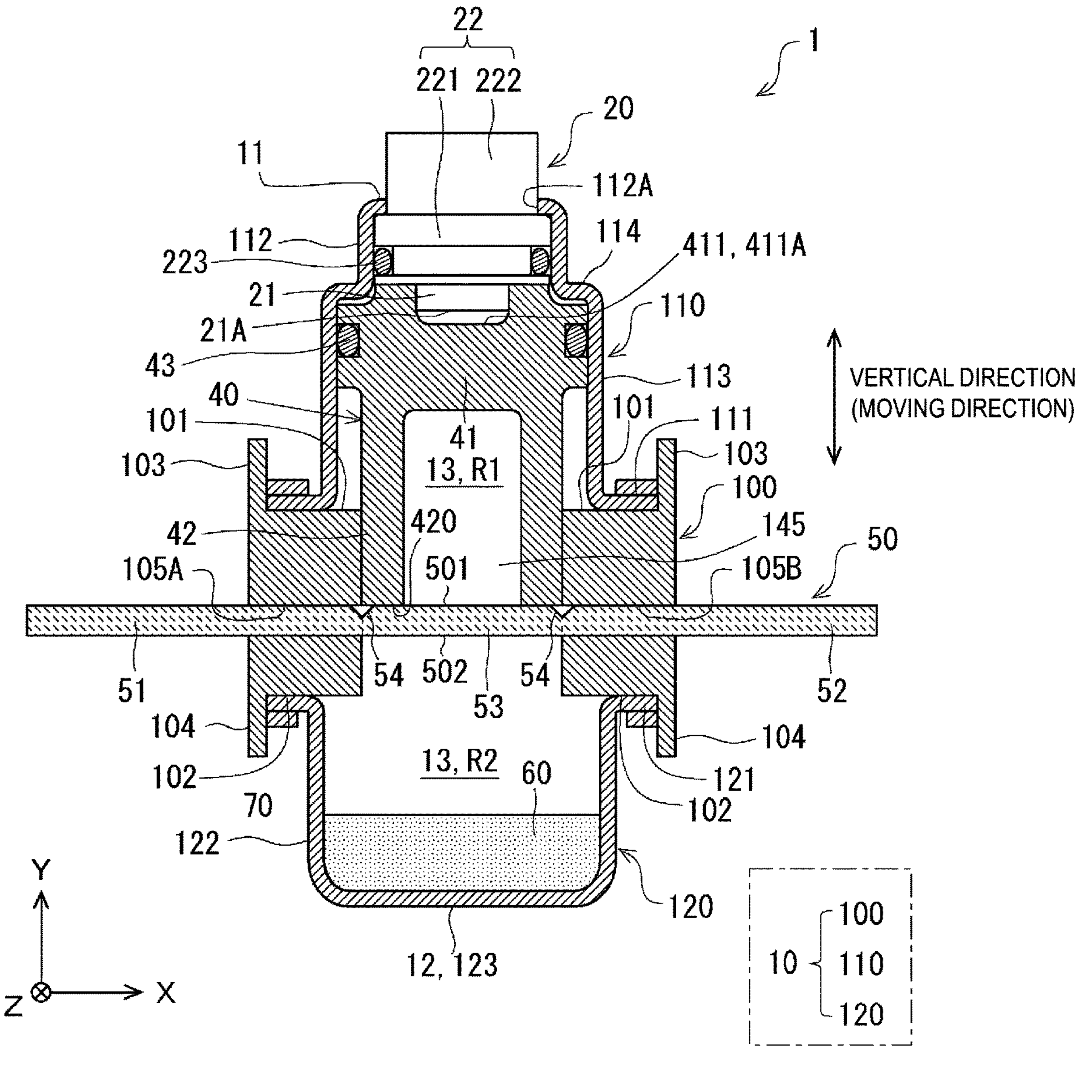
FIG. 1 is a view illustrating an internal structure of an electric circuit breaker device according to an embodiment.

FIG. 1 is a view illustrating an internal structure of an electric circuit breaker device (hereinafter simply referred to as the "breaker device") 1 according to an embodiment. The breaker device 1 is a device configured to interrupt an electric circuit included in a vehicle, an electric home appliance, a photovoltaic system, or the like when an abnormality occurs in the electric circuit or in a system including a lithium battery (lithium ion battery, for example)

of the electric circuit, thereby preventing great damage. In the present specification, a cross section in the height direction illustrated in FIG. 1 (direction in which an accommodating space 13 described later extends) is referred to as a vertical cross section of the breaker device 1, and a cross section in a direction orthogonal to the height direction is referred to as a transverse cross section of the breaker device 1. FIG. 1 illustrates a state prior to actuation of the breaker device 1.

The breaker device 1 includes a housing 10, an igniter 20, a projectile 40, a conductor piece 50, and a coolant material 60. The housing 10 is an outer shell member, and encloses an accommodating space 13 extending in a direction from a first end portion 11 on an upper end side to a second end portion 12 on a lower end side. This accommodating space 13 is a space formed in a straight line, making the projectile 40 movable, and extends along a vertical direction of the breaker device 1. As illustrated in FIG. 1, the projectile 40 is accommodated on the upper end side in a vertical direction (extending direction) of the accommodating space 13 formed inside the housing 10. In the present specification, the vertical direction is also referred to as a Y-axis direction, the left-right direction is also referred to as an X-axis direction, and the depth direction is also referred to as a Z-axis direction. However, in the present specification, the vertical direction and XYZ-axis directions of the breaker device 1 merely indicate a relative positional relationship among the respective elements in the breaker device 1 for convenience of description of the embodiment. For example, the posture when installing the breaker device 1 is not limited to the direction illustrated in the drawing.

Housing

The housing 10 includes a housing body 100, a top holder 110, and a bottom container 120. The housing body 100 is bonded to the top holder 110 and the bottom container 120, thereby forming the housing 10 that is integral.

The housing body 100 has, for example, a substantially prismatic outer shape. However, the shape of the housing body 100 is not particularly limited. In addition, the housing body 100 includes a cavity portion 145 formed therethrough along the vertical direction. This cavity portion 145 forms a portion of the accommodating space 13. Furthermore, the housing body 100 includes an upper surface 101 to which a flange portion 111 of the top holder 110 is fixed and a lower surface 102 to which a flange portion 121 of the bottom container 120 is fixed. In the present embodiment, an upper tubular wall 103 having a tubular shape is provided erected upward from the upper surface 101 on the outer circumferential side of the upper surface 101 in the housing body 100. In the present embodiment, the upper tubular wall 103 has a rectangular tubular shape, for example, but may have other shapes. On the outer circumferential side of the lower surface 102 in the housing body 100, a lower tubular wall 104 having a tubular shape is provided suspended downward from the lower surface 102. In the present embodiment, the lower tubular wall 104 has a rectangular tubular shape, for example, but may have other shapes. The housing body 100 configured as described above can be formed from an insulating member such as a synthetic resin, for example. For example, the housing body 100 may be formed from nylon, which is a type of polyamide synthetic resin.

Top Holder

Next, the top holder 110 will be described. The top holder 110 is, for example, a cylindrical member having a stepped cylindrical tubular shape with a hollow inside. The top holder 110 includes a small diameter cylinder portion 112 positioned on the upper side (first end portion 11 side), a large diameter cylinder portion 113 positioned on the lower side, a connection portion 114 connecting these, and the flange portion 111 extending outward from a lower end of the large diameter cylinder portion 113. For example, the small diameter cylinder portion 112 and the large diameter cylinder portion 113 are coaxially disposed, and the large diameter cylinder portion 113 has a diameter slightly larger than that of the small diameter cylinder portion 112.

The contour of the flange portion 111 in the top holder 110 has a substantially quadrangular shape that fits inside the upper tubular wall 103 in the housing body 100. For example, the flange portion 111 may be integrally fastened to the upper surface 101 in the housing body 100 using a screw or the like, or may be fixed thereto by a rivet or the like, in a state of being disposed inside the upper tubular wall 103. Further, the top holder 110 may be bonded to the housing body 100 in a state where a sealant is applied between the upper surface 101 of the housing body 100 and a lower surface of the flange portion 111 in the top holder 110. This can increase airtightness of a tubular space (a portion of the accommodating space 13) formed in the housing 10. Further, instead of the sealant or in combination with the sealant, an O-ring may be interposed between the upper surface 101 of the housing body 100 and the flange portion 111 of the top holder 110 to increase the airtightness of the tubular space.

The cavity portion formed inside the small diameter cylinder portion 112 in the top holder 110 functions as an accommodating space for accommodating a portion of the igniter 20 as illustrated in FIG. 1. Further, the cavity portion formed inside the large diameter cylinder portion 113 in the top holder 110 communicates with the cavity portion of the housing body 100 positioned below; and forms a portion of the tubular space. The top holder 110 configured as described above can be formed from an appropriate metal member, such as stainless steel or aluminum, having excellent strength and durability, for example. However, a material for forming the top holder 110 is not particularly limited. In addition, for the shape of the top holder 110 as well, the above aspect is an example, and other shapes may be adopted.

Bottom Container

Next, the bottom container 120 will be described. The bottom container 120) has a substantially tubular bottomed shape with a hollow inside, and includes a side wall portion 122, a bottom wall portion 123 connected to a lower end of the side wall portion 122, and a flange portion 121 connected to an upper end of the side wall portion 122. The side wall portion 122 has, for example, a cylindrical tubular shape. The flange portion 121 extends outward from the upper end of the side wall portion 122. The contour of the flange portion 121 in the bottom container 120 has a substantially quadrangular shape that fits inside the lower tubular wall 104 in the housing body 100. For example, the flange portion 121 may be integrally fastened to the lower surface 102 in the housing body 100 using a screw or the like, or may be fixed thereto by a rivet or the like, in a state of being disposed inside the lower tubular wall 104. Here, the bottom container 120 may be bonded to the housing body 100 in a state where the sealant is applied between the lower surface 102 of the housing body 100 and an upper surface of the flange portion 121 in the bottom container 120. This can increase airtightness of a tubular space (a portion of the accommodating space 13) formed in the housing 10. Further, instead of the sealant or in combination with the sealant, an O-ring may be interposed between the lower surface 102 of the housing body 100 and the flange portion 121 of the bottom container 120 to increase the airtightness of the tubular space.

Note that the above aspect regarding the shape of the bottom container 120 is an example, and other shapes may be adopted. Further, the cavity portion formed inside the bottom container 120 communicates with the housing body 100 positioned above, and forms a portion of the tubular space. The bottom container 120 configured as described above can be formed from an appropriate metal member, such as 30) stainless steel or aluminum, having excellent strength and durability, for example. However, a material for forming the bottom container 120 is not particularly limited. Further, the bottom container 120 may have a multilayer structure. For example, in the bottom container 120, an exterior portion facing the outside may be formed from an appropriate metal member, such as stainless steel or aluminum, having excellent strength and durability, and an interior portion facing the tubular space side may be formed from an insulating member such as a synthetic resin. Of course, the entire bottom container 120 may be formed from an insulating member.

As described above, the housing 10 in the embodiment includes the housing body 100, the top holder 110, and the bottom container 120 that are integrally assembled, and the tubular space extending in the direction from the first end portion 11 to the second end portion 12 is formed inside the housing 10. The tubular space accommodates the igniter 20, the projectile 40, a cutoff portion 53 in the conductor piece 50, the coolant material 60, and the like that will be described below in detail.

Igniter

Next, the igniter 20 will be described. The igniter 20 is an electric igniter that includes an ignition portion 21 with an ignition charge, and an igniter body 22 including a pair of electro-conduction pins (not illustrated) connected to the ignition portion 21. The igniter body 22 is surrounded by an insulating resin, for example. Further, distal end sides of the pair of electro-conduction pins in the igniter body 22 are exposed to the outside, and are connected to a power source when the breaker device 1 is used.

The igniter body 22 includes a body portion 221 having a substantially cylindrical shape and accommodated inside the small diameter cylinder portion 112 in the top holder 110, and a connector portion 222 positioned on the body portion 221. The igniter body 22 is fixed to the small diameter cylinder portion 112 by, for example, the body portion 221 being pressed to an inner circumferential surface of the small diameter cylinder portion 112. Further, a constricted portion having an outer circumferential surface recessed as compared with other locations is annularly formed along a circumferential direction of the body portion 221 at an axially intermediate portion of the body portion 221. An O-ring 223 is fitted into this constricted portion. The O-ring 223 is formed from, for example, rubber (silicone rubber, for example) or a synthetic resin, and functions to increase airtightness between the inner circumferential surface in the small diameter cylinder portion 112 and the body portion 221.

The connector portion 222 in the igniter 20 is disposed protruding to the outside through an opening 112A formed at an upper end of the small diameter cylinder portion 112. The connector portion 222 has, for example, a cylindrical tubular shape covering a side of the electro-conduction pins, allowing connection with a connector of a power source.

As illustrated in FIG. 1, the ignition portion 21 of the igniter 20 is disposed facing the accommodating space 13 (more specifically, the cavity portion formed inside the large diameter cylinder portion 113) of the housing 10. The ignition portion 21 is configured as a form accommodating an ignition charge in an igniter cup, for example. For example, the ignition charge is accommodated in the igniter cup in the ignition portion 21 in a state of being in contact with a bridge wire (resistor) suspended coupling the base ends of the pair of electro-conduction pins to each other. As the ignition charge, for example, zirconium-potassium perchlorate (ZPP), zirconium-tungsten-potassium perchlorate (ZWPP), titanium hydride-potassium perchlorate (THPP), lead tricinate, or the like may be adopted.

In actuation of the igniter 20, when an actuating current for igniting the ignition charge is supplied from the power source to the electro-conduction pins, the bridge wire in the ignition portion 21 generates heat, and as a result, the ignition charge in the igniter cup is ignited and burns, generating a combustion gas. Then, the pressure in the igniter cup increases along with the combustion of the ignition charge in the igniter cup of the ignition portion 21, a rupture surface 21A of the igniter cup ruptures, and the combustion gas is discharged from the igniter cup into the accommodating space 13. More specifically, the combustion gas from the igniter cup is discharged into a recess 411 in a piston portion 41 described later of the projectile 40 disposed in the accommodating space 13. Thereby, the projectile 40 is launched downward from the initial position in FIG. 1 along the accommodating space 13.

Projectile

Next, the projectile 40 will be described. The projectile 40 is formed from an insulating member such as synthetic resin, for example, and includes the piston portion 41 and a rod portion 42 connected to the piston portion 41. The piston portion 41 has a substantially cylindrical shape and has an outer diameter substantially corresponding to an inner diameter of the large diameter cylinder portion 113 in the top holder 110. For example, the diameter of the piston portion 41 may be slightly smaller than the inner diameter of the large diameter cylinder portion 113. The shape of the projectile 40 can be changed as appropriate according to the shape of the housing 10 and the like.

Further, the recess 411 having a cylindrical shape, for example, is formed on an upper surface of the piston portion 41. This recess 411 receives the ignition portion 21. A bottom surface of the recess 411 is formed as a pressure receiving surface 411A that receives energy received from the igniter 20 during actuation of the igniter 20. Further, a constricted portion having an outer circumferential surface recessed as compared with other locations is annularly formed along a circumferential direction of the piston portion 41 at an axially intermediate portion of the piston portion 41. An O-ring 43 is fitted into this constricted portion. The O-ring 43 is formed from, for example, rubber (silicone rubber, for example) or a synthetic resin, and functions to increase airtightness between an inner circumferential surface in the large diameter cylinder portion 113 and the piston portion 41.

The rod portion 42 of the projectile 40 is a rod-shaped member having an outer circumferential surface smaller in diameter than the piston portion 41 and extending along the extending direction of the accommodating space 13, for example, and is integrally connected to a lower end side of the piston portion 41. When the igniter 20 is actuated, the rod portion 42 moves along the extending direction of the accommodating space 13 and is inserted into the cavity portion 145 of the housing body 100. A lower end surface of the rod portion 42 is formed as a cutting-off surface 420 for cutting off the cutoff portion 53 from the conductor piece 50 during actuation of the breaker device 1. Note that although the rod portion 42 in the present embodiment has a substantially cylindrical tubular shape, the shape thereof is not particularly limited, and can be changed in accordance with the shape and size of the cutoff portion 53 to be cut off from the conductor piece 50 during actuation of the breaker device 1. The rod portion 42 may have a columnar shape such as a cylinder, an elliptic cylinder, or a prism, for example. Note that, in the initial position of the projectile 40 illustrated in FIG. 1, a region on a distal end side including the cutting-off surface 420 in the rod portion 42 of the projectile 40 is disposed above the cavity portion (a holding region) 145 of the housing body 100.

In the projectile 40 configured as described above, the projectile 40 is projected from the initial position illustrated in FIG. 1 when the upper surface of the piston portion 41 including the pressure receiving surface 411A receives the energy from the igniter 20 during actuation of the igniter 20, and moves at high speed toward the second end portion 12 side (downward) along the accommodating space 13. Specifically, as illustrated in FIG. 1, the piston portion 41 of the projectile 40 is accommodated inside the large diameter cylinder portion 113 in the top holder 110, and is slidable in the axial direction along an inner wall surface of the large diameter cylinder portion 113. The projectile 40 after being projected is stopped when the lower end surface of the piston portion 41 comes into contact with (collides) the upper surface 101 of the housing body 100. That is, the rod portion 42 up to the rear end thereof is fitted into the cavity portion 145. In the present embodiment, the piston portion 41 of the projectile 40 has a substantially cylindrical shape, but the shape thereof is not particularly limited. As the outer shape of the piston portion 41, an appropriate shape and size can be adopted in accordance with the shape and size of the inner wall surface of the large diameter cylinder portion 113.

Coolant Material

Next, the coolant material 60 disposed in the accommodating space 13 in the housing 10 will be described. Here, as illustrated in FIG. 1, prior to actuation of the breaker device 1 (igniter 20), the cutoff portion 53 of the conductor piece 50 in a state of being held in the pair of conductor piece holding holes 105A and 105B in the housing body 100 is horizontally laid crossing the accommodating space 13 of the housing 10. Hereinafter, of the accommodating space 13 in the housing 10, a region (space) in which the projectile 40 is disposed is referred to as a “projectile accommodating portion R1”, and a region (space) positioned on an opposite side of the projectile 40 is referred to as an “arc-extinguishing region portion R2”, with the cutoff portion 53 of the conductor piece 50 interposed therebetween. Note that as described above, since a gap is formed on a side of the cutoff portion 53 disposed crossing the accommodating space 13, the projectile accommodating portion R1 and the arc-extinguishing region portion R2 are not completely isolated from each other by the cutoff portion 53, but communicate with each other. Of course, depending on the shape and size of the cutoff portion 53, the projectile accommodating portion R1 and the arc-extinguishing region portion R2 may be completely isolated from each other by the cutoff portion 53.

The arc-extinguishing region portion R2 of the accommodating space 13 is a region (space) for receiving the cutoff portion 53 cut off by the rod portion 42 of the projectile 40 projected during actuation of the breaker device 1 (igniter 20). In this arc-extinguishing region portion R2, the coolant material 60 as an arc-extinguishing material is disposed. The coolant material 60 is a coolant material for removing thermal energy of the arc generated and the cutoff portion 53 when the projectile 40 cuts off the cutoff portion 53 of the conductor piece 50, and cools the arc and the cutoff portion 53, thereby suppressing arc generation during cutting off of a current or thereby extinguishing (eliminating) the generated arc.

The arc-extinguishing region portion R2 of the breaker device 1 has significance as a space for receiving the cutoff portion 53 cut off from a first connecting end portion 51 and a second connecting end portion 52 in the conductor piece 50 by the projectile 40 and, at the same time, as a space for effectively extinguishing the arc generated when the projectile 40 cuts off the cutoff portion 53. Then, the coolant material 60 is disposed as an arc-extinguishing material in the arc-extinguishing region portion R2, and thus the arc generated when the cutoff portion 53 is cut off from the conductor piece 50 is effectively extinguished.

As one aspect of the embodiment, the coolant material 60 is solid. As one aspect of the embodiment, the coolant material 60 is formed from a shape retaining body. The shape retaining body herein is, for example, a material that can keep a constant shape when no external force is applied and can hold the integrity (does not come apart), even if deformation can occur, when an external force is applied. For example, examples of the shape retaining body include a fibrous body formed into a desired shape. In the present embodiment, the coolant material 60 is formed from a metal fiber that is a shape retaining body. Here, examples of the metal fiber forming the coolant material 60 include an aspect in which at least any one of steel wool or copper wool is included. However, the above aspects in the coolant material 60 are examples, and the coolant material 60 is not limited to the above aspects.

The coolant material 60 is formed into a substantially disk shape, for example, and is disposed at a bottom portion of the bottom container 120.

Conductor Piece

Figure 2:
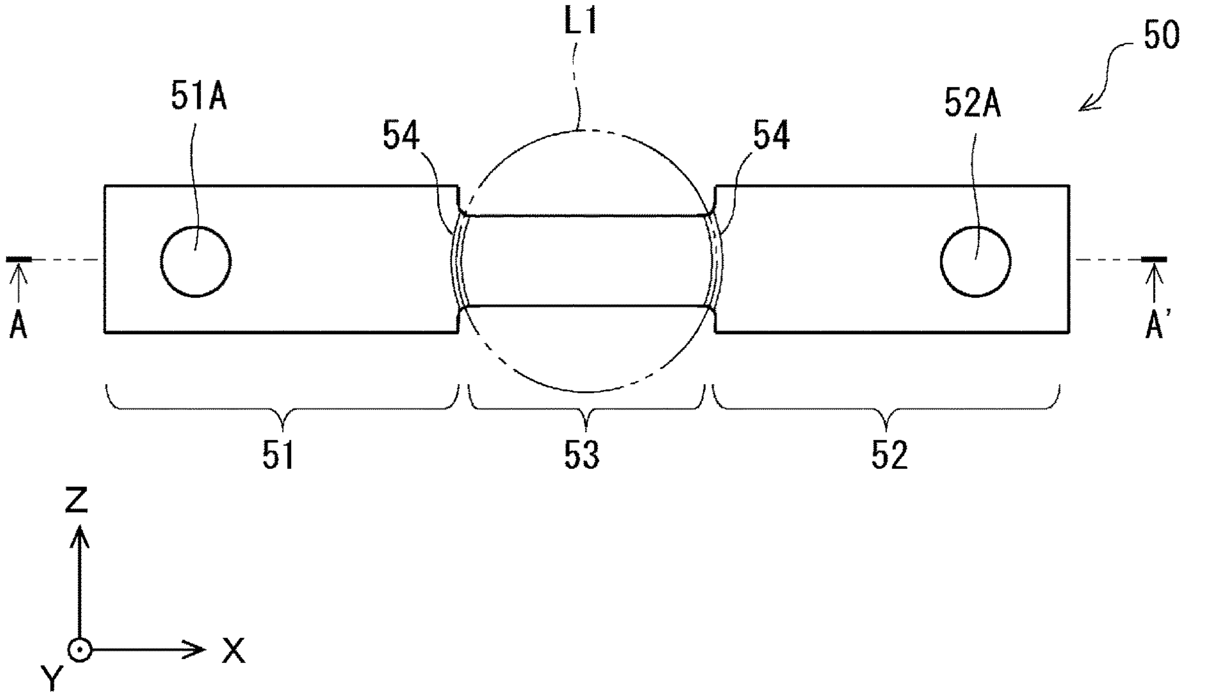
FIG. 2 is a top view of a conductor piece according to the embodiment.
Figure 3:
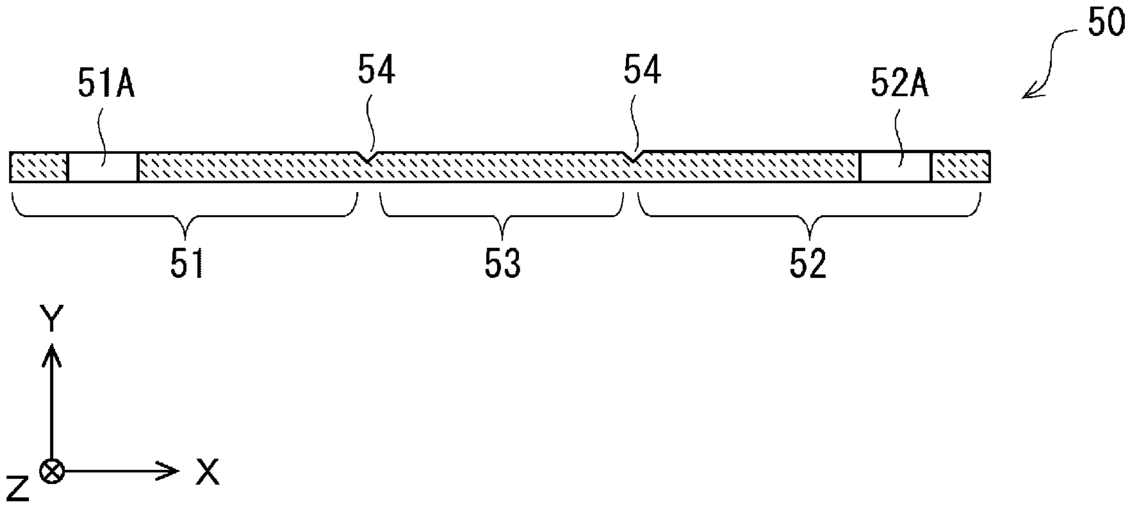
FIG. 3 is a cross-sectional view of the conductor piece taken along a line A-A' in FIG. 2.

Next, the conductor piece 50 will be described. FIG. 2 is a top view of the conductor piece 50 according to the embodiment. FIG. 3 is a cross-sectional view of the conductor piece 50 taken along a line A-A' in FIG. 2. The conductor piece 50 is a metal body having conductivity that constitutes a portion of the components of the breaker device 1 and, when the breaker device 1 is attached to a predetermined electric circuit, forms a portion of the electric circuit, and may be referred to as a bus bar. The conductor piece 50 is held by the housing body 100 and disposed crossing the cavity portion 145 in the housing body.

The conductor piece 50 can be formed from a metal such as copper (Cu), for example. However, the conductor piece 50 may be formed from a metal other than copper, or may be formed from an alloy of copper and another metal. Note that examples of metals other than copper included in the conductor piece 50 include manganese (Mn), nickel (Ni), and platinum (Pt).

In one aspect illustrated in FIG. 2, the conductor piece 50 is formed as a flat plate piece that is elongated as a whole, and includes the first connecting end portion 51 and the second connecting end portion 52 on both end sides, and the cutoff portion 53 positioned at an intermediate portion therebetween. Connection holes 51A and 52A are provided in the first connecting end portion 51 and the second connecting end portion 52 of the conductor piece 50, respectively. These connection holes 51A and 52A are used to connect with other conductors (lead wires, for example) in the electric circuit. Note that in FIG. 1, the connection holes 51A and 52A in the conductor piece 50 are not illustrated.

The cutoff portion 53 of the conductor piece 50 is a portion forcibly and physically cut by the rod portion 42 of the projectile 40 and is cut off from the first connecting end portion 51 and the second connecting end portion 52 when an abnormality such as excessive current occurs in the electric circuit to which the breaker device 1 is applied.

Here, various forms of the conductor piece 50 can be adopted, and a shape thereof is not particularly limited. While, in the example illustrated in FIG. 2, surfaces of the first connecting end portion 51, the second connecting end portion 52, and the cutoff portion 53 form the same surface, the form is not limited thereto. For example, the conductor piece 50 may be connected in a posture where the cutoff portion 53 is orthogonal to or inclined to the first connecting end portion 51 and the second connecting end portion 52. Further, the planar shape of the cutoff portion 53 of the conductor piece 50 is not particularly limited, either. Of course, the shapes of the first connecting end portion 51 and the second connecting end portion 52 of the conductor piece 50 are not particularly limited, either.

In addition, a pair of conductor piece holding holes 105A and 105B are formed in the housing body 100 according to the embodiment. The pair of conductor piece holding holes 105A and 105B extend in a transverse cross-sectional direction orthogonal to the vertical direction (axial direction) of the housing body 100. More specifically, the pair of conductor piece holding holes 105A and 105B extend in a straight line with the cavity portion (accommodating space 13) of the housing body 100 interposed therebetween. The conductor piece 50 configured as described above is held in the housing body 100 in a state of being inserted through the pair of conductor piece holding holes 105A and 105B formed in the housing body 100. In the example illustrated in FIG. 1, the first connecting end portion 51 of the conductor piece 50 is held in a state of being inserted through the conductor piece holding hole 105A, and the second connecting end portion 52 is held in a state of being inserted through the conductor piece holding hole 105B. In this state, the cutoff portion 53 of the conductor piece 50 is positioned in the cavity portion (accommodating space 13) of the housing body 100.

As described above, the conductor piece 50 attached to the housing body 100 is held orthogonally to the extending direction (axial direction) of the accommodating space 13 with the cutoff portion 53 crossing the accommodating space 13. Note that reference sign L1 illustrated in FIG. 2 denotes an outer circumferential position of the rod portion 42 positioned above the conductor piece 50 in a state of being attached to the housing body 100 of the breaker device 1. The rod portion 42 includes a cutting-off surface 420 for cutting off the cutoff portion 53 during actuation of the igniter 20 on a distal end side, and an outer circumferential position L1 of the rod portion 42 is also a contour of the cutting-off surface 420. For this reason, in the conductor piece 50, a position overlapping the outer circumferential position L1 of the rod portion 42 is an expected cutting-off position.

In the conductor piece 50, a first surface (upper surface) 501 facing the projectile accommodating portion R1 side is formed, at a predetermined expected cutting-off position, with a cutting-off assisting groove 54 having a shape conforming to the contour of the cutting-off surface 420. In other words, as illustrated in FIG. 2, the cutting-off assisting groove 54 is formed along the outer circumferential position L1 of the rod portion 42. In the present embodiment, since the rod portion 42 has a cylindrical tubular shape and the contour of the cutting-off surface 420 is circular, the cutting-off assisting groove 54 has a circular arc shape as seen in the moving direction of the projectile. Note that the cutting-off assisting groove 54 is not limited to the first surface 501 of the conductor piece 50, but may be provided in at least one of the second surface (lower surface) 502 facing the arc-extinguishing region portion R2 side or the first surface 501.

Figure 4:
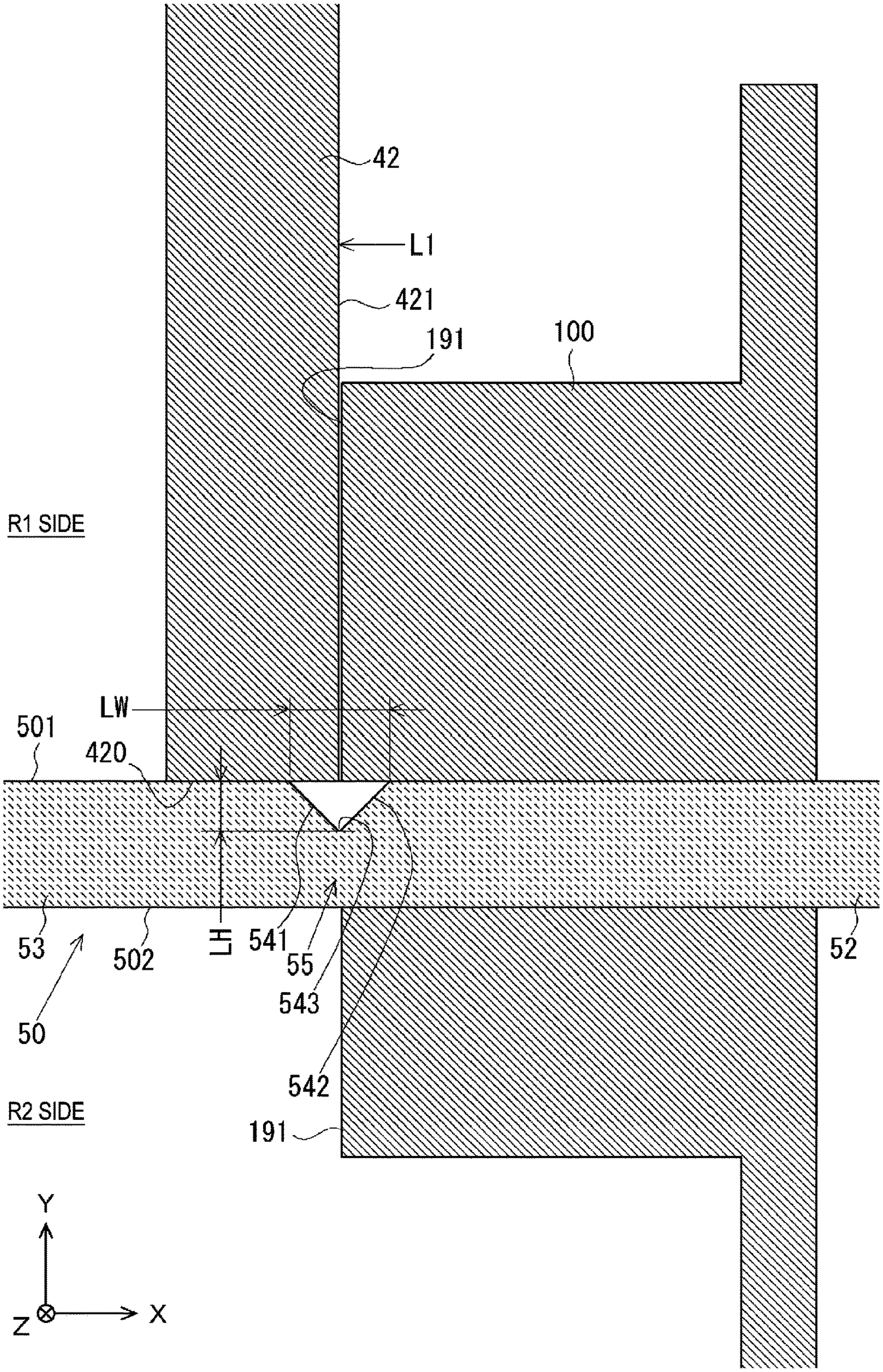
FIG. 4 is a view illustrating a positional relationship among a cutting-off assisting groove, an outer circumferential position of a rod portion, and an inner circumferential position of a housing body.

In addition, as illustrated in FIG. 3, the cutting-off assisting groove 54 is formed as a V-shaped groove of which a cross-sectional shape along a thickness direction (the Y direction in FIG. 3) of the conductor piece 50 is V-shaped. FIG. 4 is a view illustrating a positional relationship among the cutting-off assisting groove 54, the outer circumferential position L1 of the rod portion 42, and the inner circumferential position of the housing body.

In FIG. 4, the cutting-off assisting groove 54 is provided in the first surface 501 of the conductor piece 50 and is a V-shaped groove that is long in the depth direction of the drawing. The cutting-off assisting groove 54 is a space defined by an inclined surface 541 provided inclined from the first surface 501 toward the second surface 502 and an inclined surface 542 provided adjacent to the inclined surface 541. An angle formed by the inclined surface 541 and the inclined surface 542 on an inner side of the cutting-off assisting groove 54 is not particularly limited, but may be, for example, 30 degrees to 120 degrees, and is 90 degrees in the present embodiment. In addition, a width LW of the cutting-off assisting groove 54 in the first surface 501 in FIG. 4 may be, for example, 1.0 mm to 2.0 mm, and a depth LH may be, for example, 0.5 mm to 1.0 mm. The cutting-off assisting groove 54 of the present embodiment is formed with the width LW of 2.0 mm and the depth LH of 1.0 mm.

A gap between an outer circumferential surface 421 of the rod portion 42 and an inner circumferential surface 191 of the housing body 100 is small (for example, 0.1 mm). Both the outer circumferential surface 421 of the rod portion 42 and the inner circumferential surface 191 of the housing body 100 are provided at positions substantially overlapping a bottom portion 543 of the cutting-off assisting groove 54 in the height direction. Note that the outer circumferential surface 421 of the rod portion 42 and the inner circumferential surface 191 of the housing body 100 are not limited to the positions overlapping the bottom portion 543 of the cutting-off assisting groove 54 in the height direction, and may be provided at positions substantially overlapping the cutting-off assisting groove 54.

As such, in the present embodiment, the cutting-off assisting groove 54 is provided at the expected cutting-off position of the conductor piece 50, and the thickness of the conductor piece 50 in the vicinity of the bottom portion thereof is made thinner than other portions to form a portion that is fragile (fragile part) 55. For this reason, a force applied by the cutting-off surface 420 of the projectile 40 when the igniter 20 is actuated is concentrated on the fragile part 55, and thus the conductor piece 50 is quickly cut.

Note that in the present embodiment, the cross-sectional shape of the cutting-off assisting groove 54 is a V-shape, but is not limited thereto, and may be other shapes such as a U-shape or a semicircular shape.

Operation

Next, operation content when the breaker device 1 is actuated to interrupt the electric circuit will be described. As described above, FIG. 1 illustrates a state of the breaker device 1 prior to actuation (hereinafter also referred to as the "pre-actuation initial state"). In this pre-actuation initial state, in the projectile 40 in the breaker device 1, the piston portion 41 is positioned on the first end portion 11 side (upper end side) in the accommodating space 13, and the cutting-off surface 420 formed at the lower end of the rod portion 42 is set at the initial position positioned on the upper surface of the cutoff portion 53 in the conductor piece 50.

Furthermore, the breaker device 1 according to the embodiment further includes an abnormality detection sensor (not illustrated) configured to detect an abnormal state of a device (such as a vehicle, a power generation facility, or a power storage facility) to which an electric circuit to be cut off is connected, and a control unit (not illustrated) configured to control the actuation of the igniter 20. In addition to the current flowing through the conductor piece 50, the abnormality detection sensor may be able to detect an abnormal state on the basis of a voltage or a temperature of the conductor piece 50. Further, the abnormality detection sensor may be, for example, an impact sensor, a temperature sensor, an acceleration sensor, a vibration sensor, or the like, and may detect an abnormal state such as an accident or fire on the basis of an impact, a temperature, acceleration, or vibration in a device such as a vehicle. The control unit of the breaker device 1 is a computer capable of performing a predetermined function by executing a predetermined control program, for example. The predetermined function of the control unit may be realized by corresponding hardware. Then, when excessive current flows through the conductor piece 50 forming a portion of the electric circuit to which the breaker device 1 is applied, the abnormal current is detected by the abnormality detection sensor. Abnormality information regarding the detected abnormal current is passed from the abnormality detection sensor to the control unit. For example, the control unit is energized from an external power source (not illustrated) connected to the electro-conduction pins of the igniter 20 and actuates the igniter 20 based on the current value detected by the abnormality detection sensor. Here, the abnormal current may be a current of a value that exceeds a predetermined threshold value set for protection of a predetermined electric circuit. Note that the abnormality detection sensor and the control unit described above need not be included in the components of the breaker device 1, and may be included in a device separate from the breaker device 1, for example. Further, the abnormality detection sensor and the control unit are not essential configurations of the breaker device 1.

For example, when an abnormal current of the electric circuit is detected by an abnormality detection sensor that detects an abnormal current of the electric circuit, the control unit of the breaker device 1 actuates the igniter 20. That is, an actuating current is supplied from the external power source (not illustrated) to the electro-conduction pins of the igniter 20, and as a result, the ignition charge in the ignition portion 21 is ignited and burns, generating a combustion gas. Then, the rupture surface 21A ruptures due to rise in pressure in the ignition portion 21, and the combustion gas of the ignition charge is discharged from the inside of the ignition portion 21 into the accommodating space 13.

Here, the ignition portion 21 of the igniter 20 is received in the recess 411 of the piston portion 41, and the rupture surface 21A of the ignition portion 21 is disposed facing the pressure receiving surface 411A of the recess 411 in the projectile 40. Therefore, the combustion gas from the ignition portion 21 is discharged to the recess 411, and the pressure (combustion energy) of the combustion gas is transmitted to the upper surface of the piston portion 41 including the pressure receiving surface 411A. As a result, the projectile 40 moves downward in the accommodating space 13 in the extending direction (axial direction) of the accommodating space 13.

Figure 5:
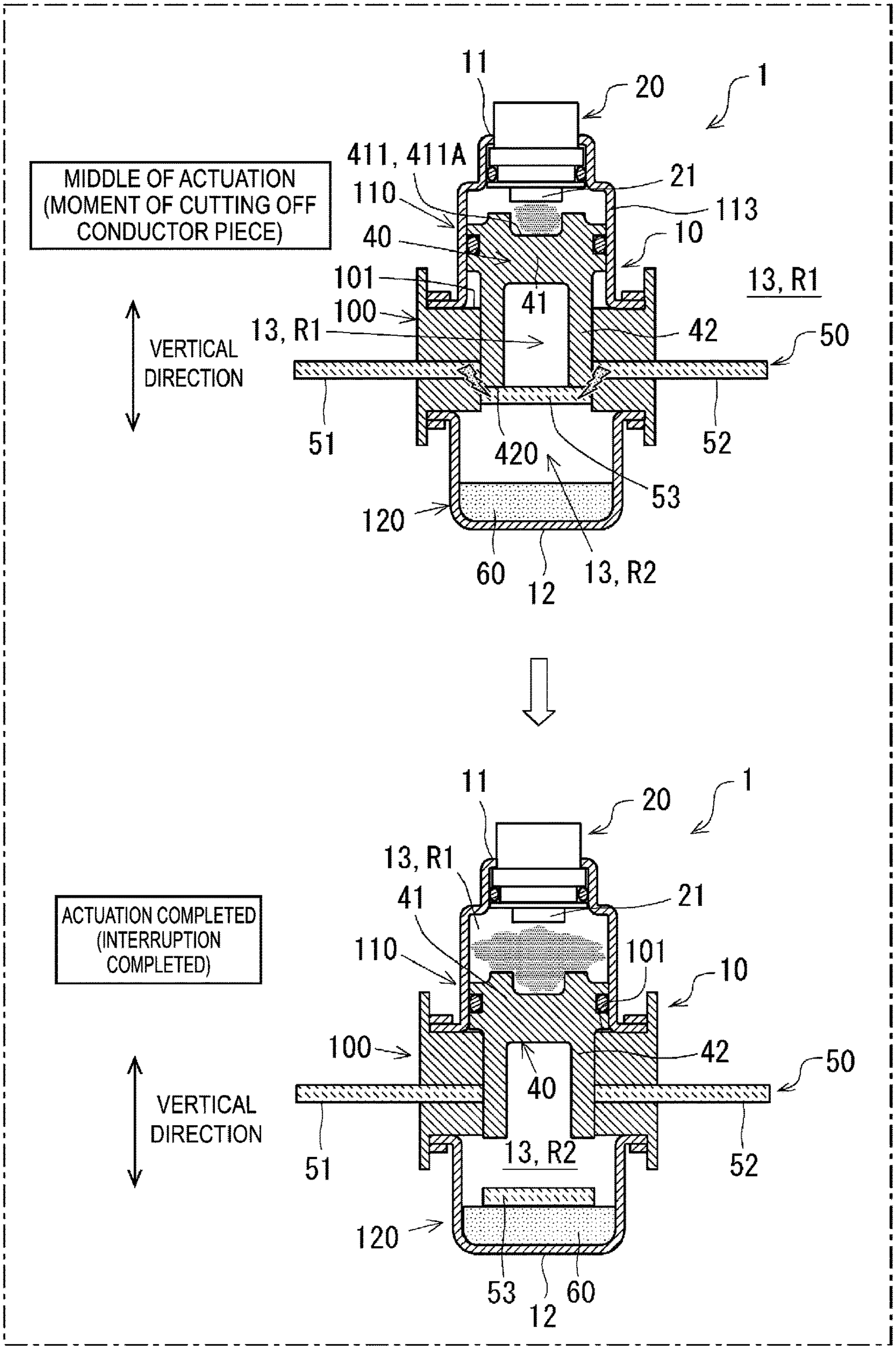
FIG. 5 is a view illustrating actuation situations of the breaker device according to the embodiment.

FIG. 5 is a view illustrating actuation situations of the breaker device 1 according to the embodiment. The upper half of FIG. 5 illustrates a situation in the middle of actuation of the breaker device 1, and the lower half of FIG. 5 illustrates a situation in which the actuation of the breaker device 1 is completed. As described above, upon actuation of the igniter 20, the projectile 40 having received the pressure (combustion energy) of the combustion gas of the ignition charge is vigorously 20) pushed downward. As a result, the cutting-off surface 420 formed on the lower end side of the rod portion 42 pressingly cuts, by shearing, the boundary portions between the first connecting end portion 51 and the cutoff portion 53 and between the second connecting end portion 52 and the cutoff portion 53 in the conductor piece 50. As a result, the cutoff portion 53 is cut off from the conductor piece 50. Note that as long as the projectile 40 can be moved smoothly in the extending direction (axial direction) of the accommodating space 13 when the igniter 20 is actuated, the shape and the dimensions of the projectile 40 can be freely determined, and the outer diameter of the piston portion 41 in the projectile 40 may be set to a dimension equal to the inner diameter of the large diameter cylinder portion 113 in the top holder 110, for example.

Then, as illustrated in the lower half of FIG. 5, the projectile 40 moves downward in the extending direction (axial direction) of the accommodating space 13 by a predetermined stroke until the lower end surface of the piston portion 41 comes into contact with (collides) the upper surface 101 of the housing body 100. In this state, the cutoff portion 53, which has been cut off from the conductor piece 50 by the rod portion 42 of the projectile 40, is received in the arc-extinguishing region portion R2 where the coolant material 60 is disposed. As a result, the first connecting end portion 51 and the second connecting end portion 52 positioned on both ends of the conductor piece 50 are electrically disconnected, and the predetermined electric circuit to which the breaker device 1 is applied is forcibly interrupted.

Effects of Embodiment

In the breaker device 1 according to the embodiment, when the projectile 40 moves along the accommodating space 13 by actuation and cuts the conductor piece 50, a force applied to the conductor piece 50 is concentrated on the fragile part 55. Therefore, the conductor piece 50 can be quickly cut and generation of an arc can be suppressed.

Modification 1

Figure 6:
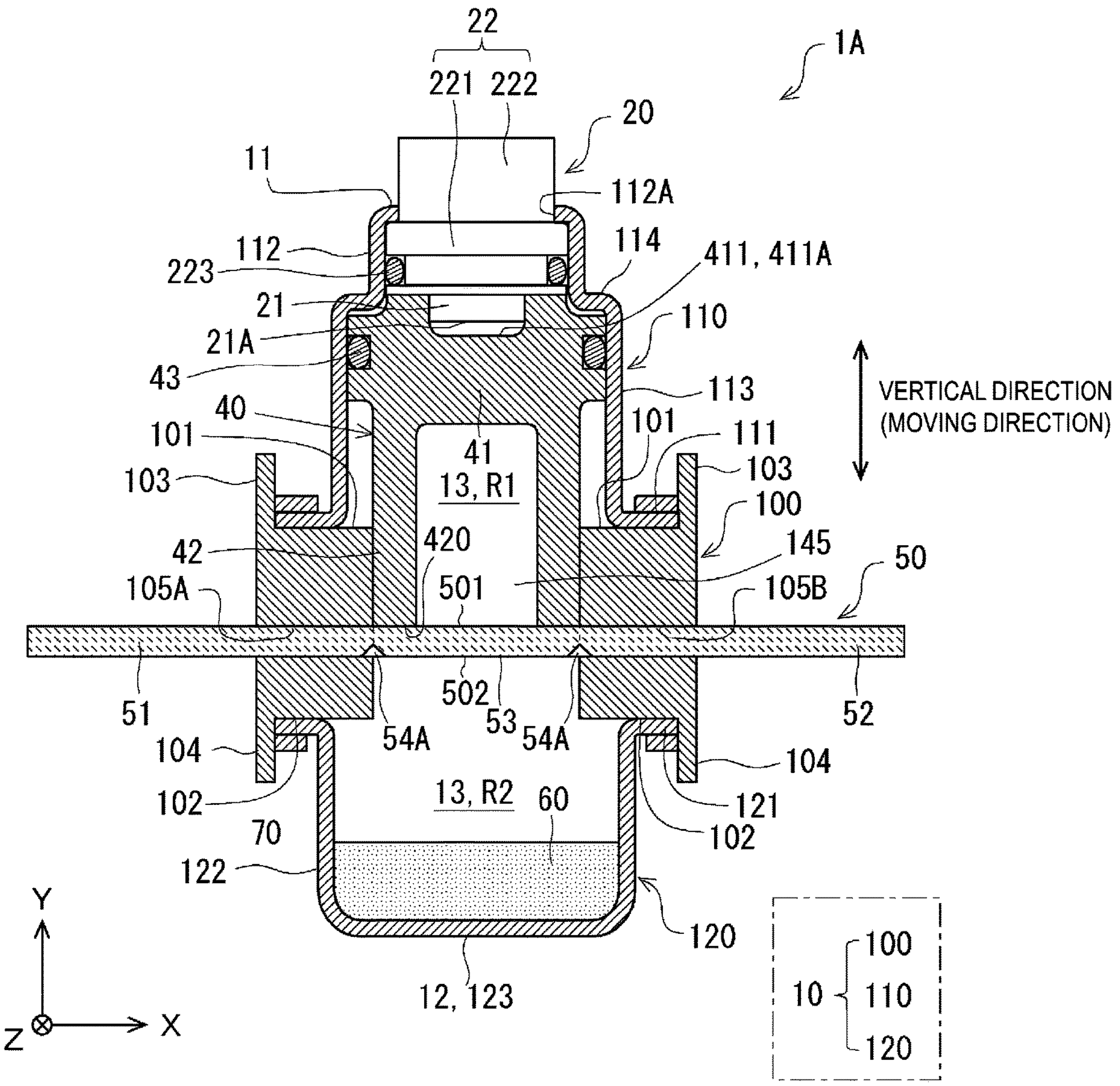
FIG. 6 is a view illustrating a configuration of a breaker device according to a modification 1.

FIG. 6 is a view illustrating a configuration of a breaker device 1A according to a modification 1. As illustrated in FIG. 6, the present modification is different from the embodiment described above due to having a configuration in which a cutting-off assisting groove 54A is provided in the second surface 502 of the conductor piece 50, and the other configurations are the same. Accordingly, the same elements are denoted by the same reference numerals or the like and the description thereof will not be repeated.

The cutting-off assisting groove 54A of the present modification is provided in the second surface 502 of the conductor piece 50, and is formed to be a vertically symmetrical shape as compared with the cutting-off assisting groove 54 of the embodiment described above. That is, the cutting-off assisting groove 54A is a V-shaped groove of which the width of a cross section illustrated in FIG. 6 spreads from the first surface 501 side toward the second surface 502 side. As such, even in the configuration in which the cutting-off assisting groove 54A is provided in the second surface 502 of the conductor piece 50, since a portion where the cutting-off assisting groove 54A is provided is reduced in thickness to form a fragile part, the conductor piece 50 is quickly cut during actuation of the breaker device 1A, and generation of an arc can be suppressed.

Modification 2

Figure 7:
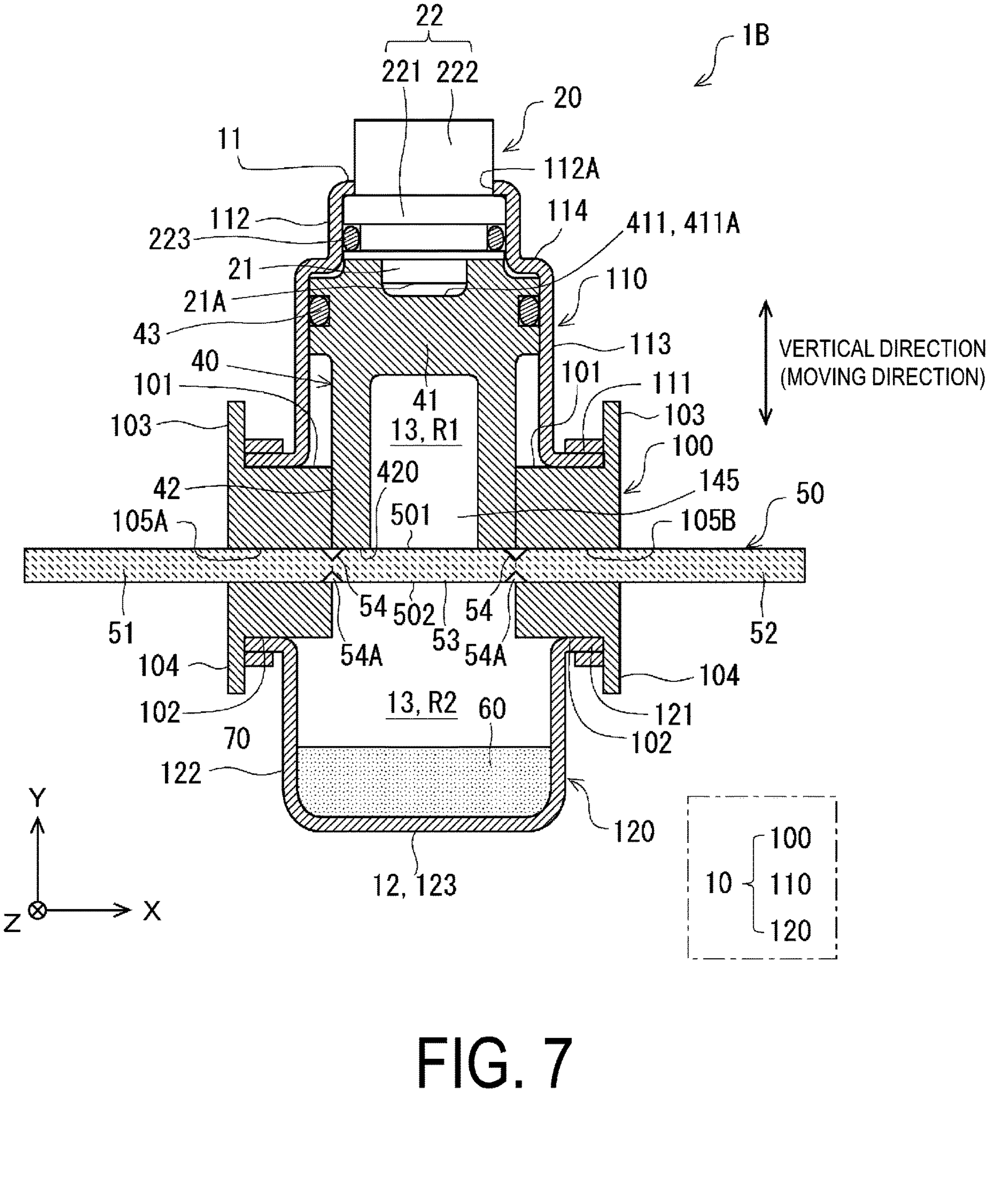
FIG. 7 is a view illustrating a configuration of a breaker device according to a modification 2.

FIG. 7 is a view illustrating a configuration of a breaker device 1B according to a modification 2. As illustrated in FIG. 7, the present modification is different from the embodiment described above due to having a configuration in which the cutting-off assisting grooves 54 and 54A are provided on the first surface 501 side and the second surface 502 side of the conductor piece 50, respectively, and the other configurations are the same. Accordingly, the same elements are denoted by the same reference numerals or the like and the description thereof will not be repeated.

The cutting-off assisting groove 54 of the present modification is the same as that of the embodiment described above, and the cutting-off assisting groove 54A is the same as that of the modification 1 described above. As such, even in the case of the configuration in which the cutting-off assisting grooves 54 and 54A are provided on the first surface 501 side and the second surface 502 side of the conductor piece 50, respectively, a portion between the cutting-off assisting groove 54 and the cutting-off assisting groove 54A in the height direction of the conductor piece 50 serves as a fragile part, the conductor piece 50 is quickly cut during actuation of the breaker device 1B, and generation of an arc can be suppressed.

While the embodiment of the electric circuit breaker device according to the present disclosure has been described above, each of the aspects disclosed in the present specification can be combined with any other feature disclosed in the present specification.

REFERENCE SIGNS LIST

1 Breaker device
10 Housing
13 Accommodating space
20 Igniter
40 Projectile
42 Rod portion
50 Conductor piece
53 Cutoff portion
54, 54A Cutting-off assisting groove
55 Fragile part
60 Coolant material
145 Cavity portion

The invention claimed is:

1. An electric circuit breaker device comprising:

a housing including an accommodating space inside, the accommodating space extending in one direction and including a projectile accommodating portion formed at one end side and an arc-extinguishing region portion formed at the other end side;

an igniter provided at the housing;

a projectile accommodated in the projectile accommodating portion and configured to be projected from the projectile accommodating portion toward an arc-extinguishing region portion side along the accommodating space by energy received from the igniter; and a conductor piece provided at a housing body of the housing and forming a portion of an electric circuit, the conductor piece including, at a portion of the conductor piece, a cutoff portion to be cut off by the projectile, the cutoff portion being disposed crossing between the projectile accommodating portion and the arc-extinguishing region portion, wherein the projectile includes, on the one end side, a piston portion, and, on the other end side, a tubular cylindrical rod portion extending directly from the piston portion and defining a cutting-off surface configured to cut off the cutoff portion during actuation of the igniter, the cutting off surface has a circular shape, and of the conductor piece, at least one of a first surface facing a projectile accommodating portion side or a second surface facing the arc-extinguishing region portion side is formed with a cutting-off assisting groove at a predetermined expected cutting-off position where the cutoff portion is pressingly cut by the cutting-off surface during actuation of the igniter, the cutting-off assisting groove having a circular arc shape conforming to a contour of the cutting-off surface as seen in a moving direction of the projectile, the cutting-off assisting groove is formed as a V-shaped groove of which a cross-sectional shape along a thickness direction of the conductor piece is V-shaped, and an outer circumferential edge of the cutting-off surface and an inner circumferential edge of the housing body are provided at positions substantially overlapping a bottom portion of the V-shaped groove in the moving direction of the projectile.

2. The electric circuit breaker device according to claim 1, wherein the cutting-off assisting groove is formed on both a first surface side and a second surface side of the conductor piece.

* * * * *